US007797094B2

(12) United States Patent  (10) Patent No.: US 7,797,094 B2
Miura (45) Date of Patent: Sep. 14, 2010

(54) TURNING CONTROL APPARATUS FOR VEHICLE

(75) Inventor: Takami Miura, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 776 days.

(21) Appl. No.: 11/790,624

(22) Filed: Apr. 26, 2007

(65) Prior Publication Data

US 2007/0265758 A1 Nov. 15, 2007

(30) Foreign Application Priority Data

May 12, 2006 (JP) .............................. 2006-134276

(51) Int. Cl.
    *B60T 8/24* (2006.01)
(52) U.S. Cl. .............................. 701/72; 701/84; 701/69; 701/70; 701/41; 303/146; 303/140; 180/197
(58) Field of Classification Search .................. 701/72, 701/41, 84, 69; 303/140, 146; 180/157
    See application file for complete search history.

(56) References Cited

U.S. PATENT DOCUMENTS

| 4,939,656 | A | * | 7/1990 | Hoashi et al. ................. 701/83 |
| 4,970,650 | A | * | 11/1990 | Hashiguchi et al. ........... 701/83 |
| 5,329,453 | A | * | 7/1994 | Tsuyama et al. .............. 701/83 |
| 5,388,658 | A | | 2/1995 | Ando et al. |
| 5,732,371 | A | * | 3/1998 | Fujita ........................... 701/38 |
| 5,754,967 | A | * | 5/1998 | Inoue et al. ................... 701/54 |

(Continued)

FOREIGN PATENT DOCUMENTS

JP    4-331669 A    11/1992

(Continued)

OTHER PUBLICATIONS

Study on turn motion of child rovers of a reconfigurable planetary rover system;Xinyuan He et al.; Intelligent Robots and Systems, 2005. (IROS 2005). 2005 IEEE/RSJ International Conference on; Digital Object Identifier: 10.1109/IROS.2005.1545176; Publication Year: 2005.*

(Continued)

*Primary Examiner*—Cuong H Nguyen
(74) *Attorney, Agent, or Firm*—Birch, Stewart, Kolasch & Birch, LLP

(57) ABSTRACT

The turning control apparatus for a vehicle has a driving torque controlling mechanism adjusting driving torque of left and right wheels. The apparatus includes a maximum-yaw momentum value calculating means having means for estimating an outside-wheel gripping capacity, which is capacity of adhesive friction between the outside-wheel and a road surface, and an inside-wheel gripping capacity, which is capacity of adhesive friction between the inside-wheel and the road surface, and means for calculating a torque adjustment limiting value indicating an adjustment amount of driving torque by the driving torque controlling mechanism so that the adjustment amount does not exceed the gripping capacity. The maximum-yaw momentum value calculating means sets the maximum-yaw momentum value indicating possible yaw momentum, which is estimated if the driving torque is adjusted along with the torque-adjustment-limit value calculated by the torque adjustment limiting value calculating means.

6 Claims, 7 Drawing Sheets

U.S. PATENT DOCUMENTS

| | | | | |
|---|---|---|---|---|
| 5,978,726 | A * | 11/1999 | Takeda et al. | 701/84 |
| 6,131,054 | A * | 10/2000 | Shibahata | 701/1 |
| 6,240,354 | B1 * | 5/2001 | Yamada et al. | 701/70 |
| 6,324,458 | B1 * | 11/2001 | Takagi et al. | 701/70 |
| 6,360,150 | B1 * | 3/2002 | Fukushima et al. | 701/41 |
| 6,442,469 | B1 * | 8/2002 | Matsuno | 701/70 |
| 6,470,250 | B2 * | 10/2002 | Nishizaki et al. | 701/48 |
| 6,584,399 | B2 | 6/2003 | Koibuchi et al. | |
| 7,171,296 | B2 * | 1/2007 | Kato et al. | 701/70 |
| 7,318,629 | B1 * | 1/2008 | Sun et al. | 303/146 |
| 7,575,089 | B2 * | 8/2009 | Sherwin | 180/411 |
| 7,580,785 | B2 * | 8/2009 | Matsumoto et al. | 701/70 |
| 2001/0003805 | A1 | 6/2001 | Koibuchi | |
| 2006/0091727 | A1 | 5/2006 | Motoyama | |

FOREIGN PATENT DOCUMENTS

| | | | |
|---|---|---|---|
| JP | 7-003133 | * | 1/1995 |
| JP | 8-301519 | * | 11/1996 |
| JP | 9-86378 | A | 3/1997 |
| JP | 11-107802 | A | 4/1999 |
| JP | 11-260259 | * | 9/1999 |
| JP | 2003-032459 | * | 2/2003 |
| JP | 2003-344743 | * | 10/2003 |
| JP | 2006-134276 | * | 5/2006 |
| WO | WO99/56994 | * | 11/1999 |

OTHER PUBLICATIONS

Investigating motion and trajectory forms of a wheeled mobile robot on a flat surface with an inclination angle; Mahmoud, A. et al.; ICCAS-SICE, 2009; Publication Year: 2009, pp. 3418-3422.*

Abeer M. et al.; "Circular Trajectory Simulation Analysis of a Rotating Four-Legged Robot", Proc. of Int. Conf. SICE, 1B07-2, pp. 691-694, Japan, Aug. 20-22, 2008.*

Abeer M., T.Okada and T.Shimizu, "Circular Path Estimation of a Rotating Four-Legged Robot Using a Hybrid Genetic Algorithm LSM", Proc. of JSME Conf.*

T.Okada, Abeer M. and W.T. Botelho, "Trajectory Analysis of an Independently Driven Wheeled Robot and its Experimental Verification", Int.Conf. of CLAWAR, 2009.*

Design of electric differential system for an electric vehicle with dual wheel motors; Yee-Pien Yang et al., Decision and Control, 2008. CDC 2008. 47th IEEE Conference on; Digital Object Identifier: 10.1109/CDC.2008.4739021; Publication Year: 2008, pp. 4414-4419.*

Y. P. Yang and D. S. Chung, "Optimal design and control of a wheel motor for electric passenger cars," IEEE Trans. on Magnetics, vol. 43, pp. 51-61, No. 1, 2007.*

K. Fujii, and H. Fujimoto, "Traction control based on slip ratio estimation without detecting vehicle speed for electric vehicle," Power Conversion Conference, Nagoya, Japan, pp. 688-693, 2007.*

* cited by examiner

TURNING CONTROL APPARATUS FOR VEHICLE

BACKGROUND OF THE INVENTION (1) Field of the Invention

The present invention relates to a turning control apparatus for a vehicle that employs adjustment of the driving torque between an inside wheel and an outside wheel.

(2) Description of Related Art

Techniques have been developed for improving safety of vehicles by achieving vehicle-stability during turning maneuvers. For example, the following related document 1 discloses generating yaw momentum of a vehicle based on the yaw-rate of the vehicle by controlling the difference in the driving torque between the left and right wheels to control the motion of the vehicle.

[Related Document 1] Japanese Laid-open Publication H09-86378

However, in reality, it is difficult to generate appropriate yaw momentum at a vehicle even if the driving torque difference between the left and right wheels is varied, because the capacity of traction or brake force (i.e. adhesive friction between the wheel and the road surface) is limited. This capacity is also called gripping capacity.

Particularly, by the technique of related document 1 to prevent over-steering, the driving torque may be increased beyond the gripping capacity of the inside wheel. In this situation, it is difficult for a vehicle to run straight ahead due to slip of the inside wheel, and then the degree of over-steering is increased in spite of adjusting the driving torque difference between the left and right wheels to prevent over-steering.

SUMMARY OF THE INVENTION

The present invention has been developed in consideration of this situation, and it is therefore an object of the invention to provide a turning control apparatus for a vehicle to improve turning ability and operatability of the vehicle.

For this purpose, in accordance with an aspect of the present invention, there is provided a turning control apparatus for a vehicle comprising: means for calculating a necessary yaw-momentum value indicating yaw momentum needed for turning of the vehicle; means for calculating a maximum-yaw momentum value indicating maximum yaw momentum generated by the driving torque controlling mechanism owing to adjustment of driving torque of the left-wheel and the right wheel; means for setting a target yaw-momentum value indicating target yaw momentum in such a manner that if the necessary yaw-momentum value does not exceed the maximum-yaw momentum value then the necessary yaw-momentum value is directly set as the target yaw-momentum value, and if the necessary yaw-momentum value exceeds the maximum-yaw momentum value then the necessary yaw-momentum value is clipped at the maximum-yaw momentum value as the target yaw-momentum value; and a driving torque controller for controlling the driving torque controlling mechanism so as to generate yaw momentum corresponding to the target yaw-momentum value; the maximum-yaw momentum value calculating means including, means for estimating an outside-wheel gripping capacity, which is capacity of adhesive friction between the outside-wheel and a road surface, and an inside-wheel gripping capacity, which is capacity of adhesive friction between the inside-wheel and the road surface, and means for calculating a torque adjustment limiting value indicating an adjustment amount of driving torque of the left wheel and the right wheel by the driving torque controlling mechanism so that the adjustment amount does not exceed the outside-wheel gripping capacity and the inside-wheel gripping capacity, the maximum-yaw momentum value calculating means setting the maximum-yaw momentum value indicating possible yaw momentum, which is estimated if the driving torque of the outside-wheel and the inside-wheel is adjusted by the driving torque controller using the torque-adjustment-limit value calculated by the torque adjustment limiting value calculating means.

According to the present invention, it is possible to improve turning ability and operatability of the vehicle owing to production of appropriate yaw momentum in such a manner that the inside-wheel driving torque does not exceed the inside-wheel gripping capacity and the outside-wheel driving torque does not exceed the outside-wheel gripping capacity, these by avoiding slip of the wheels.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DESCRIPTION OF THE PREFERRED EMBODIMENTS

The embodiment of the present invention will now be described with reference to the accompanying drawings.

Figure 1:
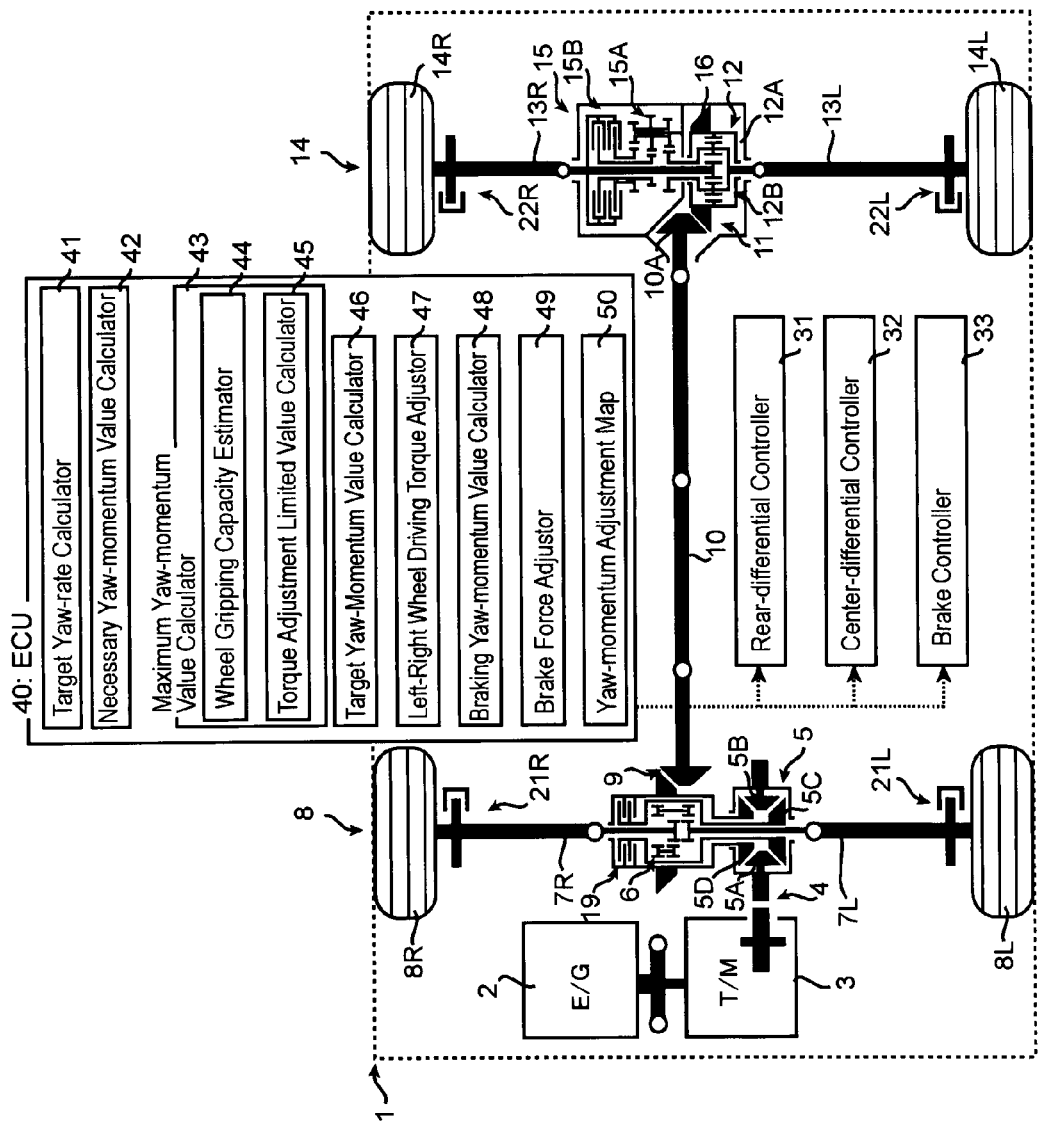
FIG. 1 is a block diagram schematically showing the entire organization of an embodiment of the present invention.

As shown in FIG. 1, an engine 2 is mounted on a vehicle 1. The torque output from the engine 2 is transmitted to a center differential 5 via transmission 3 and intermediate gear mechanism 4. The center differential 5 has a front-rear wheels limiting mechanism 19 which will be described later.

The output torque from the center differential 5 is individually transmitted to a front-right wheel 8R and a front-left wheel 8L via a front differential 6 and each of shafts 7L and 7R. The torque output from the differential 5 is individually transmitted to a rear-right wheel 14R and rear-left wheel 14L via a front-hypoid gear mechanism 9, a propeller shaft 10, a rear-hypoid gear mechanism 11, a rear-differential 12 and each of shafts 13R and 13L. The rear-differential 12 has a right-left wheel limiting mechanism (driving torque controlling mechanism) 15 which will be described later.

The front-differential 6, so-called torque-sensing type of differential, can limit the speed difference mechanically between the right and left wheels 8R and 8L corresponding to the torque input from the engine 2.

The center differential 5 has differential pinions 5A and 5B, and side gears 5C and 5D engaging with the pinions 5A and 5B, respectively. The torque input from the differential pinions 5A and 5B is transmitted to the rear wheels 14. Further, the center differential 5 permits rotation of the front wheels 8 at a different speed from the rear wheels 14, and accordingly, the turning ability of the vehicle 1 is secured.

The center differential 5 also has a front-rear wheel limiting mechanism 19 which can vary the degree of limitation of the speed differences between the front wheels 8 and the rear wheels 14, and can distribute variably the output torque from the engine 2 to each of the front wheels 8 and the rear wheels 14.

The front-rear wheel limiting mechanism 19 is a hydraulic multiple disk clutch that can vary the degree of limitation of speed differences between the front wheels 8 and the rear wheels 14 in response to varied oil pressure input from a driving oil pressure unit (not shown). Thus, the distributed torque is variably input to each of the front wheels 8 and rear wheels 14.

The oil pressure output from the driving oil pressure unit to the front-rear wheel limiting mechanism 19, being controlled by a center-differential controller 32, is described later.

As stated above, according to the front-rear wheel limiting mechanism 19, it is possible to improve the traction of the vehicle 1 by limiting the different speeds between the front wheels 8 and the rear wheels 14, and it is also possible to improve the turning ability of the vehicle 1 by not limiting the different speeds between the front wheels 8 and the rear wheels 14.

Each of the rear wheels 14R and 14L are connected to the rear-differential 12 including the right-left wheel limiting mechanism 15 for varying the difference of driving torque transmitted to each of the rear wheels 14R and 14L.

A rear-left rotation speed sensor 14L (means for sensing rotation speed of an outside-wheel or means for sensing rotation speed of an inside-wheel; not shown) is equipped at the rear-left wheel 14L. A rear-right rotation speed sensor 14R (means for sensing rotation speed of an outside-wheel or means for sensing rotation speed of an inside-wheel; not shown) is equipped at the rear-right wheel 14R.

Figure 4:
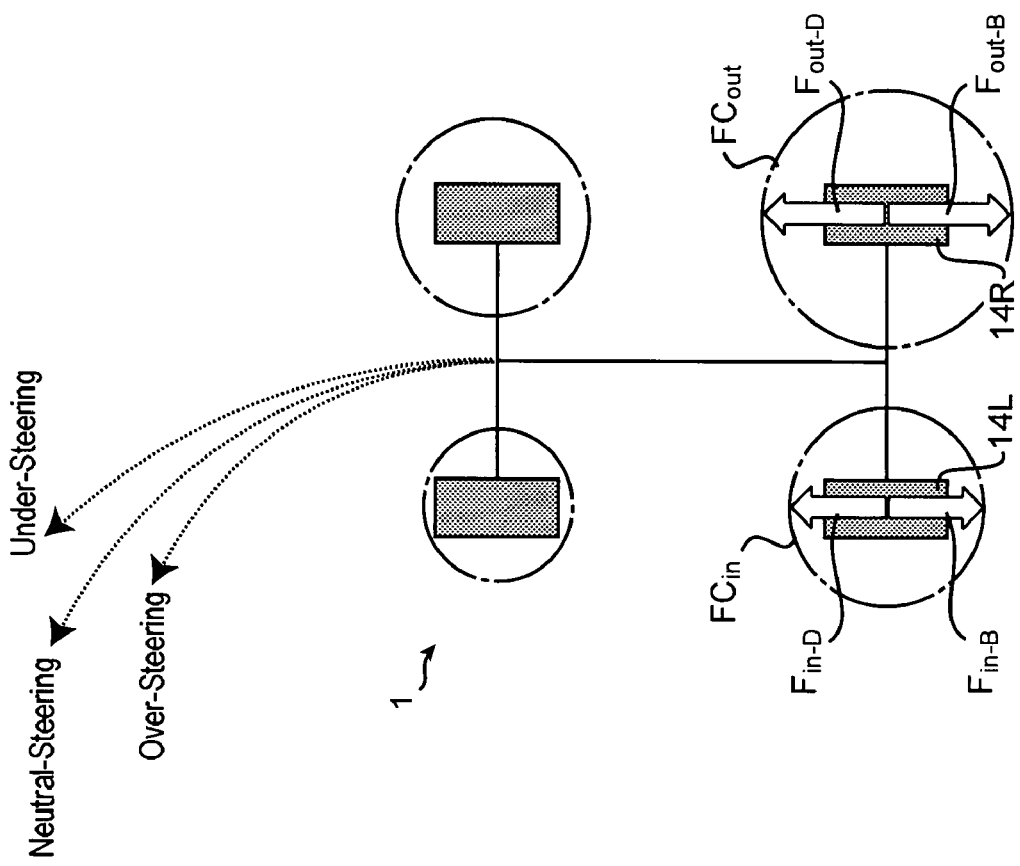
FIG. 4 is a schematic diagram showing motion of the vehicle being over-steered or under-steering in the embodiment of the present invention.

As shown in FIG. 4, in this embodiment, it is assumed that the rear-left wheel 14L is the inside-wheel and the rear-right wheel 14R is the outside-wheel because the vehicle 1 turns left in principal.

The rear-differential 12 has a case 12A. A crown gear 16, which is engaged with the pinion gear 10A on the propeller shaft 10, is formed around the case 12A, and a planetary gear mechanism 12B is equipped inside the case 12A. The planetary gear mechanism 12B is for permitting the difference of speed between each of rear wheels 14R and 14L.

Namely, the planetary gear mechanism 12B enables transmission to the driving torque, which is input from the engine 2 to the crown gear 16 via the propeller shaft 10 and a pinion gear 10A, to each of the rear wheels 14R and 14L while not limiting the different speeds between the rear-right wheel 14R and the rear-left wheel 14L.

The right-left wheel limiting mechanism 15 includes a speed-varying mechanism 15A and a torque-transmitting mechanism 15B which can vary the output torque thereof. The right-left wheel limiting mechanism 15 is for varying, based on the signals from an ECU (Electronic Control Unit) 40, the difference of torque between the right wheel 14R and the left wheel 14L corresponding to the driving conditions of the vehicle 1.

The speed-varying mechanism 15A varies the speed of rotation of rear left wheel 14L and outputs the torque to the torque-transmitting mechanism 15B.

The torque-transmitting mechanism 15B is a wet multiple-disk clutch which enables adjustment of the output torque based on the oil pressure input from the driving oil pressure unit.

As stated above, it is possible to vary individually the torque distributed to each of wheels 14R and 14L, using a technique that varies the speed of the rear-right wheel 14R with the speed-varying mechanism 15A and which adjusts the output torque using the torque-transmitting mechanism 15B. Hence the driving torque input to one of wheels 14R and 14L is increased or decreased by decreasing or increasing the other driving torque.

The planetary gear mechanism 12B, the speed-varying mechanism 15A and the torque-transmitting mechanism 15B are already known, therefore, description of these techniques is omitted in this embodiment.

The oil pressure input from the driving oil pressure unit to the right-left wheel limiting mechanism 15 is controlled by a rear-differential controller 31. The rear-differential controller 31 and control thereof will be described later.

The driving oil pressure unit (not shown) includes a not-shown accumulator, a motor pump for compressing the oil in the accumulator, and a pressure sensor for sensing the oil pressure resulting from compression by the motor pump. The driving oil pressure unit further includes a solenoid-controlled valve for adjusting the oil pressure in the accumulator generated by the motor pump and a pressure-direction valve for selectively supplying the oil pressure from an oil room (not shown) in the right-left wheel limiting mechanism 15 or another oil room (not shown) in the front-rear wheel limiting mechanism 19

The rear-differential controller 31 is an electrical control unit including a not-shown interface, memories and a CPU. The rear-differential controller 31 is for adjusting individual driving torque of the rear wheels 14R and 14L through the oil pressure unit in such a manner that the controller 31 sends a torque distribution signal to the driving oil pressure unit, which signal indicates the oil pressure corresponding to the difference in driving torque between the rear wheels 14R and 14L, and also the destination of the oil pressure, and then the controller 31 actuates the oil pressure unit to control the oil pressure supply to the right-left wheel limiting mechanism 15.

For example, as shown in FIG. 4, when the vehicle 1 turns left and runs forward, the rear-differential controller 31 controls the driving oil pressure unit so that the oil pressure is input to the right-left wheel limiting mechanism 15 of rear-differential 12 from the driving oil pressure unit.

When the driving torque transmitted to the rear-left wheel (inside-wheel) 14L is decreased, accordingly the driving torque of the rear-left wheel 14L is decreased and the rotation speed of the rear-right wheel 14R is increased.

Consequently, it is possible to avoid occurrence of under-steering owing to generation of the yaw momentum in a counterclockwise (left-turning) direction.

On the other hand, when the driving torque transmitted to the rear-left wheel 14L is increased, accordingly the driving torque of the rear-right wheel 14R is decreased and the rotation speed of the rear-right wheel 14R is decreased.

Consequently, it is possible to avoid occurrence of over-steering owing to generation of the yaw momentum in a clockwise (right-turning) direction.

When the direction of yaw momentum is counterclockwise (left-turning), the yaw momentum value is positive. Likewise, when the direction of yaw momentum is clockwise (right-turning), the yaw momentum value is negative.

The center-differential controller 32, which is an electrical control unit, transmits a front-rear difference signal, which is a signal corresponding to a target speed deference between the front wheels 8 and the rear wheels 14, to the driving oil pressure unit so that the center-differential controller controls the degree of limitation for the differing speeds between the front wheels 8 and the rear wheels 14. The driving oil pressure unit varies the oil pressure input to the front-rear wheel limiting mechanism 19 at the center differential 5.

Each of wheels 8R, 8L, 14R and 14L is equipped with brakes 21R, 21L, 22R and 22L, individually. The brakes 21R, 21L, 22R and 22L are connected to a brake oil pressure unit (not shown) individually supplying the oil pressure to the brakes 21R, 21L, 22R and 22L.

Further, the vehicle 1 is equipped with a brake controller 33. The brake controller 33 is an electrical control unit including a not-shown interface, memories and a CPU.

The brake controller 33 transmits a brake pressure signal, which is a signal corresponding to a target brake oil pressure to be increased or decreased at the individual brakes 21R, 21L, 22R and 22L, to the brake oil pressure unit so that the brake oil pressure unit varies the oil pressure input to each of the brakes 21R, 21L, 22R and 22L.

The brake oil pressure unit includes a motor pump and solenoid-controlled valves for a brake oil pressure system, and the unit inputs the oil pressure to the individual brakes 21R, 21L, 22R and 22L in response to orders from the brake controller.

As described above, each of the rear-differential controller (driving torque controller) 31, the center-differential controller 32 and the brake controller 33 is individually controlled by the ECU 40.

The vehicle 1 has such not-shown sensors as a steering angle sensor, an longitudinal acceleration sensor, a lateral acceleration sensor, a yaw-rate sensor, wheel speed sensors and a vehicular velocity sensor.

The steering angle sensor senses the angle $\delta_{SW}$ of the steering wheel (not-shown) operated by a driver.

The longitudinal acceleration sensor senses acceleration $G_X$ in a longitudinal direction at the vehicle 1. The lateral acceleration sensor senses acceleration in a lateral direction at the vehicle 1.

The yaw-rate sensor senses acceleration in a rotational direction (namely yaw-rate) at the vehicle 1.

The vehicle 1 is equipped with ECU 40. The ECU 40 is an Electrical Control Unit including a not-shown interface, memories and a CPU, to which are input the results of sensing by the wheel speed sensors, the steering angle sensor, the longitudinal acceleration sensor, the lateral acceleration sensor, and the yaw-rate sensor.

The ECU 40 includes such program files stored in the memory (not shown) as a target yaw-rate calculator (target yaw-rate calculating means) 41, a necessary yaw-momentum value calculator (necessary yaw-momentum value calculating means) 42, a maximum yaw-momentum value calculator (maximum yaw-momentum value calculating means) 43, a target yaw-momentum value calculator (target yaw-momentum value calculating means) 46, a left-right wheel driving torque adjustor (left-right wheel driving torque adjustment means) 47, a braking yaw-momentum value calculator (braking yaw-momentum value calculating means) 48 and a brake force adjustor (brake force adjusting means) 49.

In the maximum yaw-momentum value calculator 43, a wheel gripping capacity estimator (wheel gripping capacity estimating means) 44 and a torque adjustment limiting value calculator (torque adjustment limiting value calculating means) 45 are included as subprograms.

In the memory of ECU 40, a torque-difference map (not shown) and a yaw-momentum adjustment map 50, which is used by the left-right wheel driving torque adjustor 47 and the brake force adjustor 49, are stored.

The target yaw-rate calculator 41 calculates theoretical target yaw-rate $\gamma_T$ based on steering angle $\sigma_{SW}$, which is detected by the steering angle sensor, and the vehicle's velocity $v_B$ which is detected by the vehicular velocity sensor. In this embodiment, the operation direction, when the steering wheel is used to turn the vehicle 1 left, is defined as positive. The operation direction, when the steering wheel used to turn the vehicle 1 right, is defined as negative. Further, yaw-rate in a counterclockwise direction is defined as positive, and yaw-rate in a clockwise direction is defined as negative.

The necessary yaw-momentum value calculator 42 calculates a necessary yaw-momentum value $YM_{ADD}$, which indicates yaw momentum needed for turning of the vehicle 1, owing to execution of a feedback control based on an actual yaw-rate $\gamma_R$, namely, by adjustment of the target yaw-rate $\gamma_T$ obtained by the target yaw-rate calculator 41 referring to the actual yaw-rate $\gamma_R$ detected by the yaw-rate sensor. Yaw-momentum in a counterclockwise direction is defined as positive and yaw-momentum in a clockwise direction is defined as negative.

In this embodiment, "over-steering" occurs during left-turning if the actual yaw-rate $\gamma_R$ is larger than the target yaw-rate $\gamma_T$ or during right-turning if the actual yaw-rate $\gamma_R$ is smaller than the target yaw-rate $\gamma_T$, because the actual motion of the vehicle 1 exceeds the driver's intention in a yaw direction. "Under-steering" occurs during left-turning if the actual yaw-rate $\gamma_R$ is smaller than the target yaw-rate $\gamma_T$ or during right-turning if the actual yaw-rate $\gamma_R$ is larger than the target yaw-rate $\gamma_T$ because the actual motion of the vehicle 1 is not sufficient the driver's intention in a yaw direction The maximum yaw-momentum value calculator 43 calculates the yaw-momentum limit, which is a maximum yaw-momentum value, generated owing to adjustment of the driving torque of the inside-wheel and outside-wheel executed by the right-left wheel limiting mechanism 15. The maximum yaw-momentum value calculator 43 includes the wheel gripping capacity estimator 44 and the torque adjustment limiting value calculator 45.

The wheel gripping capacity estimator 44 estimates an outside-wheel gripping capacity $GR_{OUT}$, which is capacity of adhesive friction between the outside-wheel and a road surface, and an inside-wheel gripping capacity $GR_{IN}$, which is capacity of adhesive friction between the inside-wheel and the road surface, based on the longitudinal acceleration $G_X$ sensed by the longitudinal acceleration sensor and the lateral acceleration $G_Y$ sensed by the lateral acceleration sensor.

In this embodiment, when the vehicle 1 accelerates forward, the longitudinal acceleration $G_X$ is defined as positive. When the vehicle 1 decelerates backward, the longitudinal acceleration $G_X$ is defined as negative. When the vehicle 1 turns left, the lateral acceleration $G_Y$ is defined as positive. When the vehicle 1 turns right, the lateral acceleration $G_Y$ is defined as negative.

The inside-wheel gripping capacity $GR_{IN}$ and outside-wheel gripping capacity $GR_{OUT}$ are obtained based on such factors of the vehicle 1 as weight, weight distribution, height of center of gravity, wheelbase, tread, distribution of stiffness against the vehicle's roll at a front side and a rear side, height of roll center at the front side and the rear side and friction coefficient between the wheels 8L, 8R, 14L and 14R and the road surface.

Namely, according to the increments of absolute value of the lateral acceleration $G_Y$, motion of weight in the vehicle 1 in the lateral direction is increased. Therefore, the outside-wheel gripping capacity $GR_{OUT}$ is increased and the inside-wheel gripping capacity $GR_{IN}$ is decreased, according to the increments of absolute value of the lateral acceleration $G_Y$.

Further, when the vehicle 1 is accelerated, load of the rear wheels 14L and 14R is increased due to motion of the center of gravity of the vehicle 1 in the longitudinal direction, according to the increments of absolute value of the longitudinal acceleration $G_X$. In this case, therefore, the outside-wheel gripping capacity $GR_{OUT}$ and the inside-wheel gripping capacity $GR_{IN}$ are increased, according to the increments of absolute value of the longitudinal acceleration $G_X$.

When the vehicle 1 is decelerated, load of the rear wheels 14L and 14R are decreased due to motion of weight-center of the vehicle 1 in the longitudinal direction, according to the increments of absolute value of the longitudinal acceleration $G_X$. In this case, therefore, the outside-wheel gripping capacity $GR_{OUT}$ and the inside-wheel gripping capacity $GR_{IN}$ are decreased, according to the increments of absolute value of the longitudinal acceleration $G_X$.

The torque adjustment limiting value calculator 45 calculates a torque adjustment limiting value $T_{MAX}$, which indicates an adjustment amount of driving torque of the rear-left wheel 14L and the rear-right wheel 14R so that the adjustment amount of the driving torque does not exceed the outside-wheel gripping capacity $GR_{OUT}$ and the inside-wheel gripping capacity $GR_{IN}$. In this embodiment, the adjustment amount of the driving torque, for generating yaw momentum at the vehicle 1 in a counter clock wise direction, is defined as positive. Whereas, the adjustment amount of the driving torque, for generating yaw momentum at the vehicle 1 in a clockwise direction, is defined as negative.

In other words, when the negative driving torque is input to the rear-left wheel 14L and the positive driving torque is input to the rear-right wheel 14R, the adjustment amount of driving torque is positive. Whereas, when the positive driving torque is input to the rear-left wheel 14L and the negative driving torque is input to the rear-right wheel 14R, the adjustment amount of driving torque is negative. Alternatively, it is possible to individually adopt each of an inside-wheel torque adjustment limiting value of inside-wheel $T_{in-MAX}$ and an outside-wheel torque adjustment limiting value of outside-wheel $T_{out-MAX}$ instead of the torque adjustment limiting value $T_{MAX}$.

Additionally, the maximum yaw-momentum value calculator 43 estimates a maximum yaw-momentum value $YM_{AYC-MAX}$ indicating possible yaw momentum that will be generated at the vehicle 1 if the driving torque of the inside-wheel and the outside-wheel are adjusted corresponding to the torque adjustment limiting value $T_{MAX}$ obtained by the torque adjustment limiting value calculator 45. Further, the maximum yaw-momentum value calculator 43 sets the maximum yaw-momentum value $YM_{AYC-MAX}$ on the yaw-momentum adjustment map 50 in respect of longitudinal acceleration $G_X$. The yaw-momentum adjustment map 50 will be described later.

The target yaw-momentum value calculator 46 sets a target yaw-momentum value $YM_{AYC}$ indicating target yaw-momentum in such a manner that if the necessary yaw-momentum value $YM_{ADD}$ is equal to or greater than the maximum negative yaw-momentum value $YM_{AYC-MAX-R}$ and the necessary yaw-momentum value $YM_{ADD}$ is equal to or smaller than the maximum positive yaw-momentum $YM_{AYC-MAX-L}$, namely, following formula (1) is satisfied, the necessary yaw-momentum value $YM_{ADD}$ is directly set as the target yaw-momentum value $YM_{AYC}$.

$$YM_{AYC-MAX-R} \leq YM_{ADD} \leq YM_{AYC-MAX-L} \tag{1}$$

If the necessary yaw-momentum value $YM_{ADD}$ is greater than the maximum positive yaw-momentum value $YM_{AYC-MAX-L}$, namely, following formula (2) is satisfied, the target yaw-momentum value calculator 46 sets the target yaw-momentum value $YM_{AYC}$ by clipping the necessary yaw-momentum value $YM_{ADD}$ at the positive maximum-yaw momentum value $YM_{AYC-MAX-L}$.

$$YM_{ADD} > YM_{AYC-MAX-L} \tag{2}$$

If the necessary yaw-momentum value $YM_{ADD}$ is smaller than the negative maximum yaw-momentum value $YM_{AYC-MAX-R}$, namely following formula (3) is satisfied, the target yaw-momentum value calculator 46 sets the target yaw-momentum value $YM_{AYC}$ by clipping the necessary yaw-momentum value $YM_{ADD}$ at the negative maximum-yaw momentum value $YM_{AYC-MAX-R}$.

$$YM_{ADD} < YM_{AYC-MAX-R} \tag{3}$$

The control for setting the target yaw-momentum value $YM_{AYC}$ by the target yaw-momentum value calculator 46 is called "limit-control".

Figure 2:
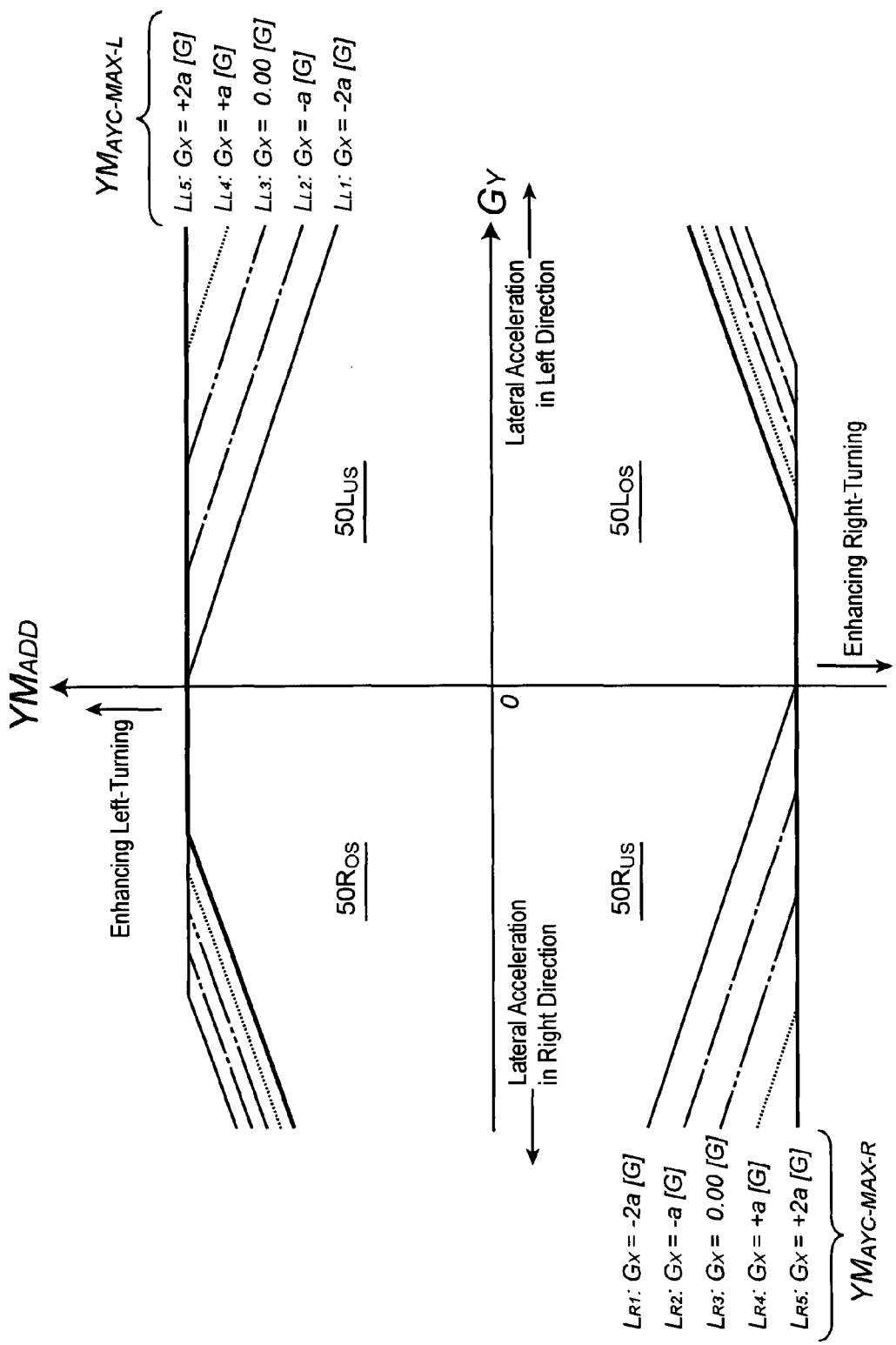
FIG. 2 is a graph schematically showing a yaw momentum adjustment map for the embodiment of the present invention.

As shown in FIG. 2, on the yaw-momentum adjustment map 50, the necessary yaw-momentum value $YM_{ADD}$ is defined as vertical axis and the lateral acceleration $G_Y$ is defined as horizontal axis.

On the yaw-momentum adjustment map 50, the maximum yaw-momentum value $YM_{AYC-MAX}$ is defined by the wheel gripping capacity estimator 44 as the characteristic lines $L_{L1}$-$L_{L5}$ and $L_{R1}$-$L_{R5}$ corresponding to respective longitudinal acceleration $G_X$. The relationship between the longitudinal acceleration $G_X$ and the characteristic lines $L_{L1}$-$L_{L5}$ and $L_{R1}$-$L_{R5}$ is as follows.

$\pm L_{L1}, L_{R1}: G_X = -2a\ [G]$ $\pm L_{L2}, L_{R2}: G_X = -a\ [G]$ $\pm L_{L3}, L_{R3}: G_X = 0\ [G]$ $\pm L_{L4}, L_{R4}: G_X = +a\ [G]$ $L_{L5}, L_{R5}: G_X = +2a\ [G]$

The yaw-momentum adjustment map 50 includes 4 areas which are a left-turn enhancing area $50L_{US}$, a left-turn diminishing area $50L_{OS}$, a right-turn diminishing area $50R_{OS}$ and a right-turn enhancing area $50R_{US}$. In the following description, positive (>0) and negative (<0) stand for the direction of the yaw momentum of the vehicle 1.

The left-turn enhancing area $50L_{US}$ is used for setting the target yaw-momentum value $YM_{AYC}$ (>0) in a counterclockwise direction and a braking yaw-momentum value $YM_{ASC}$ (>0) in a counterclockwise direction to generate the necessary yaw-momentum value $YM_{ADD}$ (>0) at the vehicle 1 while turning and being under-steered.

The left-turn diminishing area $50L_{US}$ is used for setting the target yaw-momentum value $YM_{AYC}$ (<0) in a clockwise direction and the braking yaw-momentum value $YM_{ASC}$ (<0) in a clockwise direction to generate the necessary yaw-momentum value $YM_{ADD}$ (<0) at the vehicle 1 while turning left and being over-steered.

The right-turn diminishing area $50R_{OS}$ is used for setting the target yaw-momentum value $YM_{AYC}$ (>0) in a counterclockwise direction and the braking yaw-momentum $YM_{ASC}$ (>0) in a counterclockwise direction to generate the necessary yaw-momentum value $YM_{ADD}$ (>0) at the vehicle 1 while turning right and being with over-steered.

The right-turn enhancing area $50R_{US}$ is used for setting the target yaw-momentum value $YM_{AYC}$ (<0) in a clockwise direction and the braking yaw-momentum $YM_{ASC}$ (<0) in a clockwise direction to generate the necessary yaw-momentum value $YM_{ADD}$ (<0) at the vehicle 1 turning right with under-steering.

An example of utilization of the yaw-momentum adjustment map 50 will be described later with FIG. 7.

The left-right wheel driving torque adjustor 47 controls the right-left wheel limiting mechanism 15 so as to generate yaw momentum corresponding to the target yaw-momentum value $YM_{AYC}$ set by the target yaw-momentum value calculator 46.

The braking yaw-momentum value calculator 48 sets excess amount of the necessary yaw-momentum value $YM_{ADD}$ beyond the maximum yaw-momentum value $YM_{AYC-MAX}$ to be the braking yaw-momentum value $YM_{ASC}$.

Namely, if an excess amount of the necessary yaw-momentum value $YM_{ADD}$ is greater than the maximum yaw-momentum value $YM_{AYC-MAX-L}$ (>0) in a counterclockwise direction (i.e. following formula (4) is satisfied), the braking yaw-momentum value calculator 48 sets an excess amount of the necessary yaw-momentum value $YM_{ADD}$ as the braking yaw-momentum value $YM_{ASC}$ (>0) in a counterclockwise direction.

$$YM_{ADD} > YM_{AYC-MAX-L} \quad (4)$$

Whereas, if an excess amount of the necessary yaw-momentum value $YM_{ADD}$ is smaller than the maximum yaw-momentum value $YM_{AYC-MAX-R}$ (<0) in a clockwise direction (i.e. following formula (5) is satisfied), the braking yaw-momentum value calculator 48 sets an insufficient amount of the necessary yaw-momentum value $YM_{ADD}$ as the braking yaw-momentum value $YM_{ASC}$ (<0) in a clockwise direction.

$$YM_{ADD} < YM_{AYC-MAX-R} \quad (5)$$

In this embodiment, the braking yaw-momentum value calculator 48 can manage the process to calculate the braking yaw-momentum value $YM_{ASC}$ based on the yaw-momentum adjustment map 50 substitute for the formula (5) and (6).

This is illustrated more clearly, on the yaw-momentum adjustment map 50, the maximum yaw-momentum value $YM_{AYC-MAX}$ is defined as shown by straight lines $L_{L1}$-$L_{L5}$ and $L_{R1}$-$L_{R5}$ in FIG. 2. The excess amount of the necessary yaw-momentum value $YM_{ADD}$ beyond the maximum yaw-momentum value $YM_{AYC-MAX}$ (i.e. beyond the straight lines $L_{L1}$-$L_{L5}$ and $L_{R1}$-$L_{R5}$), is the braking yaw-momentum value $YM_{ASC}$.

In other words, the braking yaw-momentum value calculator 48 obtains the braking yaw-momentum value $YM_{ASC}$ in a manner that reads the excess amount of the necessary yaw-momentum value $YM_{ADD}$ beyond the maximum yaw-momentum value $YM_{AYC-MAX}$ (straight lines $L_{L1}$-$L_{L5}$ and $L_{R1}$-$L_{R5}$) in the yaw-momentum adjustment map 50.

The brake force adjustor 49 sends commands, which indicate each brake force of the wheels 8L, 8R, 14L and 14R equipped with the vehicle 1, to the brake controller 33 to generate yaw momentum corresponding to the braking yaw-momentum value $YM_{ASC}$ set by the braking yaw-momentum value calculator 48. The relationship between the braking yaw-momentum value $YM_{ASC}$ and the brake force of the wheels 8L, 8R, 14L and 14R is stored in the memory of the ECU 40.

The principle of embodiment of the present invention will now be described with the block diagram shown in FIG. 3.

Figure 3:
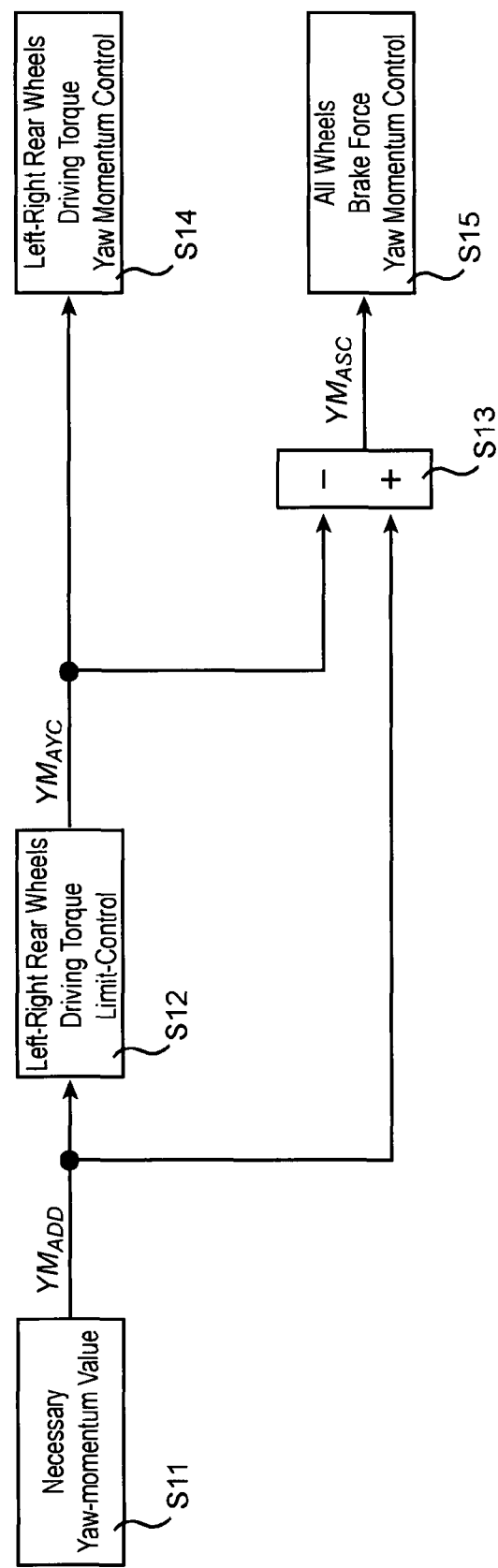
FIG. 3 is a block diagram schematically showing a manner of control in the embodiment of the present invention.

Firstly, the necessary yaw-momentum value calculator 42 calculates the necessary yaw-momentum value $YM_{ADD}$ (see S11 in FIG. 3), then the target yaw-momentum value calculator 46 obtains the target yaw-momentum value $YM_{AYC}$, which indicates amount of yaw momentum that should be generated by the right-left wheel limiting mechanism 15 in the necessary yaw-momentum value $YM_{ADD}$ (see S12 in FIG. 3). Further, the braking yaw-momentum value calculator 48 calculates the braking yaw-momentum value $YM_{ASC}$ indicating overload amount beyond the target yaw-momentum value $YM_{AYC}$ in the necessary yaw-momentum value $YM_{ADD}$ (see S13 in FIG. 3).

Then, the left-right wheel driving torque adjustor 47 controls the right-left wheel limiting mechanism 15 so as to generate yaw momentum corresponding to the target yaw-momentum value $YM_{AYC}$ set by the target yaw-momentum value calculator 46 (see S14 in FIG. 3). Further, the brake force adjustor 49 individually controls the brake force of the wheels 8L, 8R, 14L and 14R so as to generate yaw momentum corresponding to the braking yaw-momentum value $YM_{ASC}$ (see S15 in FIG. 3) Accordingly, it is possible to generate appropriate yaw momentum at the turning vehicle 1.

The operation and effect of the present invention of this embodiment will now be described as follows, assuming that the vehicle 1 is running forward and turning left as shown in FIG. 4.

Figure 6:
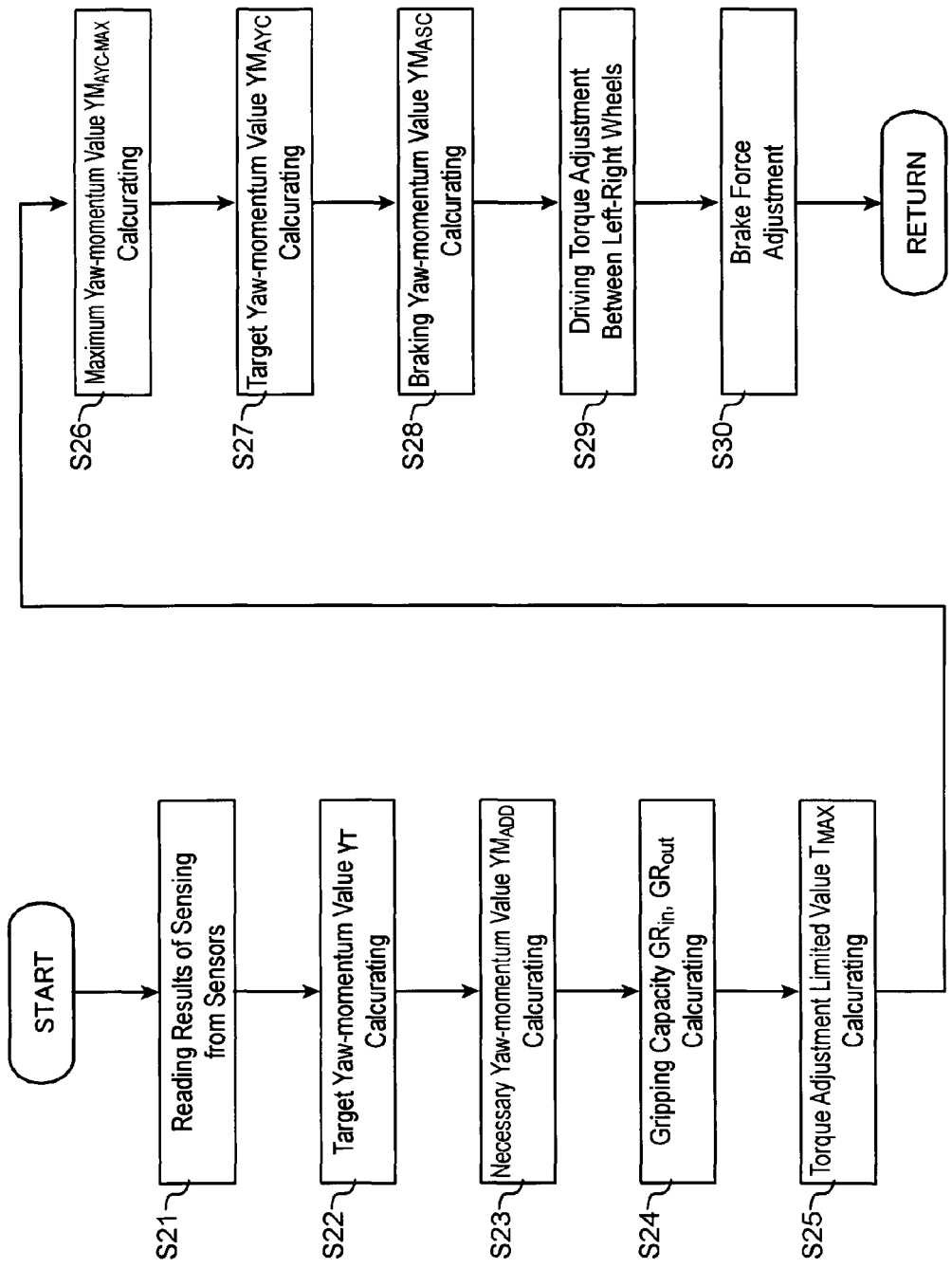
FIG. 6 is a flow chart schematically showing the control in the embodiment of the present invention.

At step S21 in FIG. 6, ECU 40 reads the longitudinal acceleration $G_X$ from the longitudinal G sensor, the lateral acceleration $G_Y$ from the lateral G sensor, and the angle $\delta_{SW}$ of the steering wheel from the steering angle sensor. Further, the ECU 40 reads the vehicle's velocity $V_B$ from the vehicular velocity sensor, and the yaw-rate $\gamma_R$ from the yaw-rate sensor.

Then, the target yaw-rate calculator 41 calculates the target yaw-rate $\gamma_T$ based on steering angle $\sigma_{SW}$, which is detected by the steering angle sensor, and the vehicle's velocity $V_B$ detected by the vehicular velocity sensor (step S22). Next, the necessary yaw-momentum value calculator 42 calculates the necessary yaw-momentum value $YM_{ADD}$ based on the target yaw-rate $\gamma_T$, which is obtained by the target yaw-rate calculator 41, and the actual yaw-rate $\gamma_R$, which is detected by the yaw-rate sensor (step S23).

Then, the wheel gripping capacity estimator 44 estimates the outside-wheel gripping capacity $GR_{OUT}$, which is capacity of adhesive friction between the outside-wheel and the road surface, and an inside-wheel gripping capacity $GR_{IN}$, which is capacity of adhesive friction between the inside-wheel and the road surface, based on the longitudinal acceleration $G_X$ sensed by the longitudinal G sensor and the lateral acceleration $G_Y$ sensed by the lateral G sensor (step S24).

Next, the torque adjustment limiting value calculator 45 calculates the torque adjustment limiting value $T_{MAX}$, which indicates the adjustment amount of driving torque of the rear-left wheel 14L and the rear-right wheel 14R so that the adjustment amount does not exceed the outside-wheel gripping capacity $GR_{OUT}$ and the inside-wheel gripping capacity $GR_{IN}$ (step S25).

At Step S26 in FIG. 6, the maximum yaw-momentum value calculator 43 estimates the maximum yaw-momentum value $YM_{AYC-MAX}$ indicating possible yaw momentum generated at the vehicle 1 if the driving torque of the inside-wheel and the outside-wheel is adjusted corresponding to the torque adjustment limiting value $T_{MAX}$. Further, as shown in FIG. 2, maximum yaw-momentum value calculator 43 sets the maximum yaw-momentum value $YM_{AYC-MAX}$ on the yaw-momentum adjustment map 50 in respect of longitudinal acceleration $G_X$.

Then, the target yaw-momentum value calculator 46 sets the target yaw-momentum value $YM_{AYC}$ in such a manner that if the necessary yaw-momentum value $YM_{ADD}$ is not beyond the maximum yaw-momentum value $YM_{AYC-MAX}$, the necessary yaw-momentum value $YM_{ADD}$ is directly set as the target yaw-momentum value $YM_{AYC}$. Whereas, if the necessary yaw-momentum value $YM_{ADD}$ is beyond the maximum yaw-momentum value $YM_{AYC-MAX}$, the target yaw-momentum value calculator 46 sets the target yaw-momentum value $YM_{AYC}$ by clipping the necessary yaw-momentum value $YM_{ADD}$ at the maximum-yaw momentum value $YM_{AYC-MAX}$ (step S27).

Next, excess amount of the necessary yaw-momentum value $YM_{ADD}$ beyond the maximum yaw-momentum value $YM_{AYC-MAX}$ is set as the braking yaw-momentum value $YM_{ASC}$ (step S28). In other words, if the vehicle 1 turns left while being under-steered, the braking yaw-momentum value calculator 48 sets the braking yaw-momentum value $YM_{ASC}$ (>0) in a counterclockwise direction to suppress the under-steering. Whereas, if the vehicle 1 turns left while being over-steered, the braking yaw-momentum value calculator 48 sets the braking yaw-momentum value $YM_{ASC}$ (<0) in a clockwise direction to suppress the over-steering.

Then, the left-right wheel driving torque adjustor 47 controls the right-left wheel limiting mechanism 15 to generate yaw momentum corresponding to the target yaw-momentum value $YM_{AYC}$ by sending commands, which indicate the difference of the driving torque between the rear-left wheel 14L and the rear-right wheel 14R, to the rear-differential controller 31 (step S29).

Next, the brake force adjustor 49 sends commands, which indicate each brake force of the wheels 8L, 8R, 14L and 14R, to the brake controller 33 to generate yaw momentum corresponding to the braking yaw-momentum value $YM_{ASC}$ (step S30).

Setting of torque adjustment limiting value $T_{MAX}$ by the torque adjustment limiting value calculator 45 will now be described visually with FIG. 4 and FIG. 5.

Figure 5:
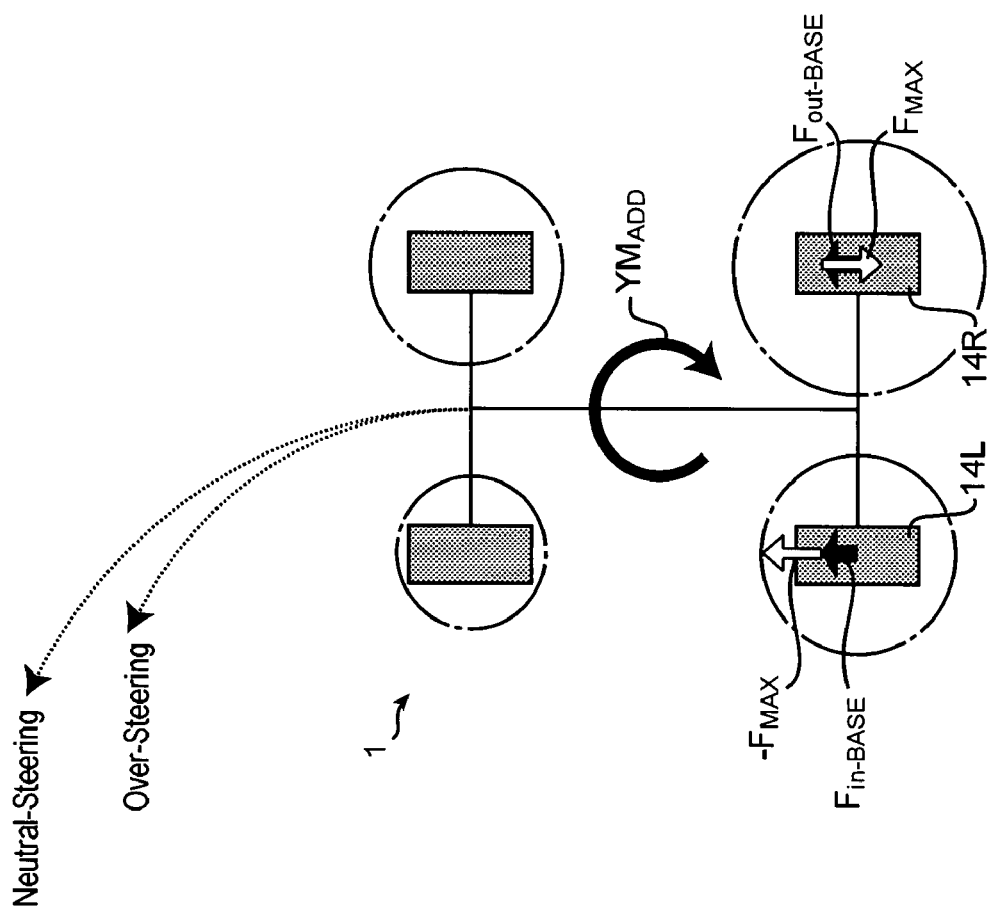
FIG. 5 is a schematic diagram showing motion of the vehicle being over-steered in the embodiment of the present invention.

As shown in FIG. 4 and FIG. 5, when the vehicle 1 turns left, the gripping capacity of the rear-left wheel 14L, namely the inside-wheel gripping capacity $GR_{IN}$, can be schematically shown as a friction-circle $FC_{in}$. Further, the gripping capacity of the rear-right wheel 14R, namely the outside-wheel gripping capacity $GR_{OUT}$, can be schematically shown as another friction-circle $FC_{out}$. Furthermore, at the inside-wheel 14L, the driving torque (positive driving torque) and the brake force (negative driving torque) are respectively shown by arrows $F_{in-D}$ and $F_{in-B}$. Likewise, at the outside-wheel 14R, the driving torque (positive driving torque) and the brake force (negative driving torque) are respectively shown by arrows $F_{out-D}$ and $F_{out-B}$.

If the arrow $F_{in-D}$ or $F_{in-B}$ extends outside the friction circle $FC_{in}$, it is shown that the driving torque or the brake force input to the inside-wheel 14L exceeds the inside-wheel gripping capacity $GR_{IN}$. Likewise, if the arrow $F_{out-D}$ or $F_{out-B}$ extends outside the friction circle $FC_{out}$, it is shown that the driving torque or the brake force input to the outside-wheel 14R exceeds the outside-wheel gripping capacity $GR_{OUT}$.

In other words, if the arrow $F_{in-D}$ or $F_{in-B}$ extends outside the friction circle $FC_{in}$, the inside-wheel 14L is slipping. Likewise, if the arrow $F_{out-D}$ or $F_{out-B}$ extends outside the friction circle $FC_{out}$, the outside-wheel 14R is slipping.

With prior arts such as those explained in the Description of Related Art, it is impossible to generate yaw momentum appropriately because they do not consider the concept of the friction circles $FC_{in}$ and $FC_{out}$ as shown in FIG. 4 of the present invention.

However, in the embodiment of the present invention, it is possible to avoid the inside-wheel 14L and outside-wheel 14R slipping even if the yaw momentum control by the right-left wheel limiting mechanism 15 is executed because the driving torques of the inside-wheel 14L and the outside-wheel 14R are individually set within the friction circle $FC_{in}$ and $FC_{out}$, respectively, by the torque adjustment limiting value calculator 45.

This is more clearly illustrated in FIG. 5. When the vehicle 1 is accelerated and over-steered, the adjustment amount of driving torque indicates that adding positive yaw momentum to the rear-left wheel 14L and negative yaw momentum to the rear-right wheel 14R to generate yaw momentum corresponding to the necessary yaw-momentum value $YM_{ADD}$ in a clockwise direction.

Namely, the torque adjustment limiting value $T_{MAX}$ is shown as arrows in FIG. 5 indicating a forward force $-F_{MAX}$ of the inside-wheel 14L and a backward force $F_{MAX}$ of the outside-wheel 14R on the road.

The torque adjustment limiting value $T_{MAX}$ is set as the torque adjustment limiting value is set in such a manner that the sum of the arrows $F_{in-BASE}$ and $-F_{MAX}$ is within the friction circle $FC_{in}$ of inside-wheel 14L and the sum of the arrows $F_{out-BASE}$ and $F_{MAX}$ is within the friction circle $FC_{out}$ of outside-wheel 14R. Namely, as shown in FIG. 5, the torque adjustment limiting value $T_{MAX}$ is set as the torque adjustment limiting value so that the sum of the arrows $F_{in-BASE}$ and $-F_{MAX}$ is within the friction circle $FC_{in}$ of inside-wheel 14L.

Absolute value of the torque adjustment limiting value $T_{MAX}$ is decreased according to increments of the lateral acceleration $G_Y$, because the friction circle $FC_{in}$ of the inside-wheel 14L is reduced according to the decrements of the arrow $-F_{MAX}$ which is reduced according to the increments of the lateral acceleration $G_Y$. Further, the absolute value of the torque adjustment limiting value $T_{MAX}$ is also decreased according to increments of the longitudinal acceleration $G_X$. Although the friction circle $FC_{in}$ of the inside-wheel 14L is expanded according to the increments of the longitudinal acceleration $G_X$, the arrow $-F_{MAX}$ is reduced according to increments of the arrow $F_{in-BASE}$ is greatly increased according to increments of the longitudinal acceleration $G_X$.

FIG. 5 shows vehicle 1 is being over-steered. However, the torque adjustment limiting value $T_{MAX}$ is set by the same concept of the procedure described above even if the vehicle 1 is under-steered. Namely, the torque adjustment limiting value $T_{MAX}$ is set so as to add negative driving torque to the rear-left wheel 14L and positive driving torque to the rear-right wheel 14R for the purpose of generating yaw momentum corresponding to the necessary yaw-momentum value $YM_{ADD}$ in a counterclockwise direction.

Further, FIG. 5 shows vehicle 1 during acceleration. However, the torque adjustment limiting value $T_{MAX}$ is set by the same concept as the procedure described above even if the vehicle 1 is decelerated. In this case, the arrows $F_{in-BASE}$ and $F_{out-BASE}$ show amount of backward force due to braking.

When the vehicle 1 is being over-steered, although the friction circle $FC_{in}$ of the inside-wheel 14L is shrunk according to the increments of the longitudinal acceleration $G_X$, absolute value of the arrow $F_{in-BASE}$ is greatly increased according to increments of the longitudinal acceleration $G_X$. Consequently, absolute value of the torque adjustment limiting value $T_{MAX}$ is increased according to the increments of the longitudinal acceleration $G_X$.

The technique of obtaining the target yaw-momentum value $YM_{AYC}$ and the braking yaw-momentum value $YM_{ASC}$ will now be described with the yaw-momentum adjustment map 50 shown in FIG. 7.

Assuming that the vehicle 1 runs forward and turns left, and that the longitudinal acceleration $G_X$ of +2a are both unchanged, further, that each lateral acceleration $G_{Y1}$, $G_{Y2}$ and $G_{Y3}$ satisfies following formula (6).

$$0 < G_{Y1} < G_{Y2} < G_{Y3} \tag{6}$$

It is also assumed that the vehicle 1 is being under-steered, and the necessary yaw-momentum value $YM_{ADD}$ calculated by the necessary yaw-momentum value calculator 42 is $YM_{ADD-L}$ ($YM_{ADD}=YM_{ADD-L}$) in a counterclockwise direction.

In this case, the maximum yaw-momentum value $YM_{AYC-MAX-L}$ is defined on the yaw-momentum adjustment map 50 as the characteristic line $L_{L5}$ by the maximum yaw-momentum value calculator 43, because the longitudinal acceleration $G_X$ is +2a.

Figure 7:
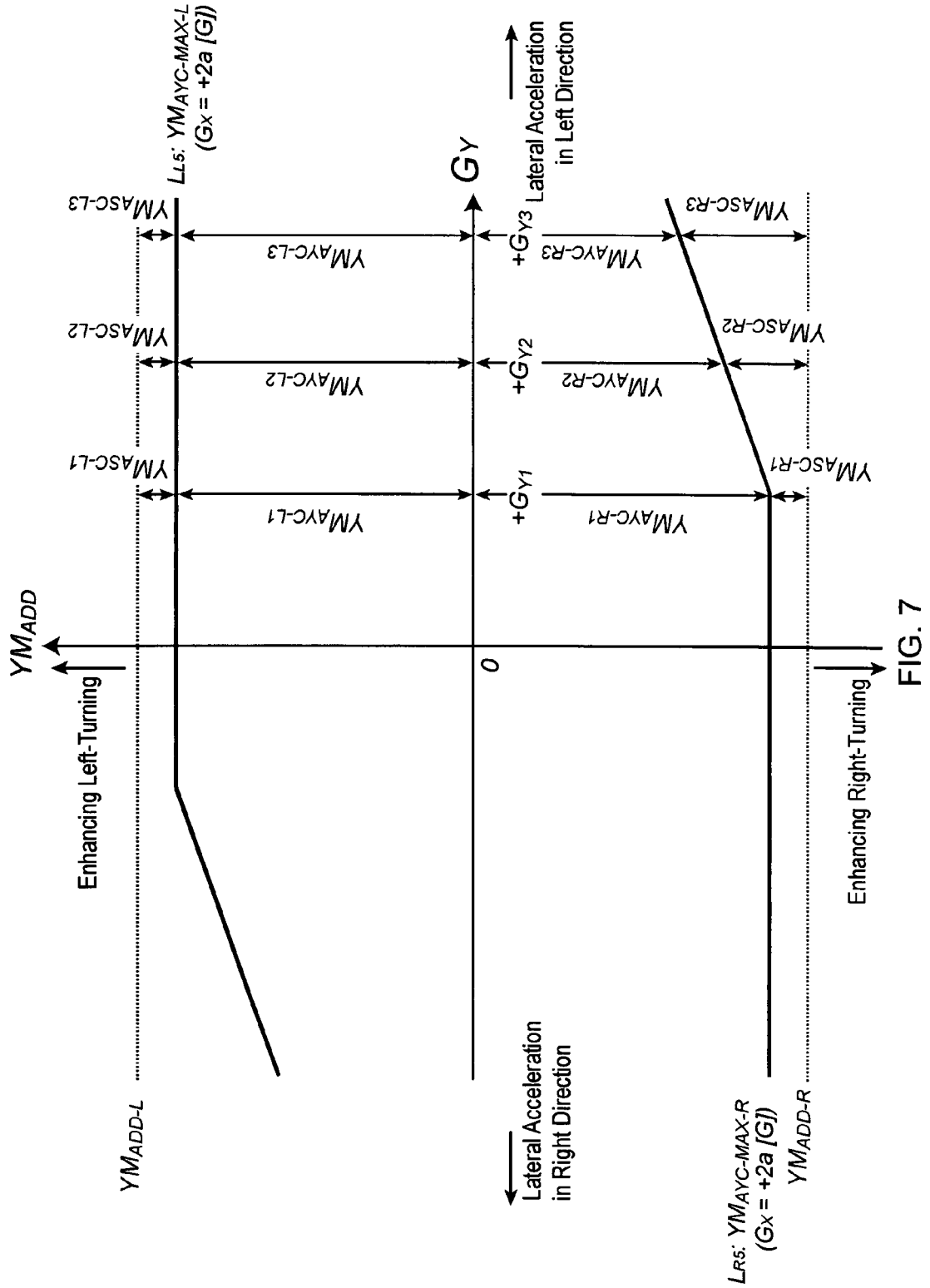
FIG. 7 is a graph schematically showing a manner of utilization of the yaw momentum adjustment map for the embodiment of the present invention.

The target yaw-momentum value calculator 46 sets the amount between zero and the characteristic line $L_{L5}$ in the necessary yaw-momentum value $YM_{ADD-L}$ as the target yaw-momentum value $YM_{AYC}$ (see $YM_{AYC-L1}$, $YM_{AYC-L2}$ and $YM_{AYC-L3}$ in FIG. 7). The braking yaw-momentum value calculator 48 sets the amount beyond the characteristic line $L_{L5}$ in necessary yaw-momentum value $YM_{ADD-L}$ as the braking yaw-momentum value $YM_{ASC}$ (see $YM_{ASC-L1}$, $YM_{ASC-L2}$ and $YM_{ASC-L3}$ in FIG. 7).

On the other hand, assuming that the vehicle 1 turns left while being over-steered, and the necessary yaw-momentum value $YM_{ADD}$ in a clockwise direction is $YM_{ADD-R}$ (i.e. $YM_{ADD}=YM_{ADD-R}$), then the longitudinal acceleration $G_X$ is +2a, therefore, the maximum yaw-momentum value $YM_{AYC-MAX-R}$ is defined on the yaw-momentum adjustment map 50 as the characteristic line $L_{R5}$ by the maximum yaw-momentum value calculator 43.

The target yaw-momentum value calculator 46 sets the amount between zero and the characteristic line $L_{R5}$ in the necessary yaw-momentum value $YM_{ADD-R}$ as the target yaw-momentum value $YM_{AYC}$ (see $YM_{AYC-R1}$, $YM_{AYC-R2}$ and $YM_{AYC-R3}$ in FIG. 7). The braking yaw-momentum value calculator 48 sets the amount beyond the characteristic line $L_{R5}$ in necessary yaw-momentum value $YM_{ADD-R}$ as the braking yaw-momentum value $YM_{ASC}$ (see $YM_{ASC-R1}$, $YM_{ASC-R2}$ and $YM_{ASC-R3}$ in FIG. 7).

As referred to above, in this embodiment of the present invention, the limit of driving torque difference between rear-left wheel 14L and rear-right wheel 14R is set by focusing on the rear-left wheel 14L of the vehicle 1 (i.e. the inside-wheel gripping capacity $GR_{IN}$) being decreased according to increments of the lateral acceleration $G_Y$ at the vehicle 1 turning left. With this invention, it is therefore possible to enhance the turning ability of the vehicle 1 owing to produce of yaw momentum corresponding to the target yaw-momentum value $YM_{AYC}$ and avoid slipping of the rear-left wheel 14L equipped with the vehicle 1.

It is possible to further enhance the turning ability of the vehicle 1 owing to production of the braking yaw-momentum value $YM_{ASC}$, which is a deficient amount to fill the necessary yaw-momentum value $YM_{ADD}$ by the target yaw-momentum value $YM_{AYC}$, by individually controlling the brake force of the wheels 8L, 8R, 14L and 14R equipped with the vehicle 1.

In other words, if sufficient yaw momentum is generated at the vehicle 1 due to adjustment of the driving torque between the rear-left wheel 14L and the rear-right wheel 14R, the adjustment of brake force of the wheels 8L, 8R, 14L and 14R is not executed. Accordingly, by the present invention, it is possible to reduce the amount of heat from the brakes 21R, 21L, 22R and 22L. It is also possible to reduce the load of wheels 8L, 8R, 14L and 14R. Furthermore, it is possible to reduce labor and costs for exchanging such expendable items as brake pads owing to prolonged life of expendable items because the load of brakes 21L, 21R, 22L and 22R due to repeated usage is reduced.

Moreover, it is possible to reduce the number of times the brake force adjustment of the wheels 8L, 8R, 14L and 14R must be carried out, and therefore, there is no deterioration in the acceleration ability of the vehicle 1.

The present invention is not limited to the above embodiment, but covers all changes and modifications which do not constitute departures from the spirit and scope of the invention.

In the above embodiment, the front differential 6 that is the torque-sensing type of differential can mechanically limit the speed difference between the right and left wheels 8R and 8L corresponding to the torque input from the engine 2. However, it is acceptable to use other types of differential as the front differential 6.

Further, it is acceptable to apply the right-left wheel limiting mechanism 15 to not only the rear-differential 12 but also the front-differential 6.

In the above embodiment, vehicle 1 is a four-wheel-drive vehicle, but It is also possible to apply the present invention to either a front-wheel drive vehicle or a rear-wheel drive vehicle.

Furthermore, in the above embodiment, the controller 31 controls the right-left wheel limiting mechanism 15 to adjust the individual driving torque output from the engine 2 to the rear wheels 14R and 14L, but the present invention is not limited to this configuration.

For example, it is acceptable to equip two motors connected to each of the right wheel and left wheel and to adjust the motor's torques, individually. In this case, it is possible to equip further such driving sources as motors and/or engines at the vehicle.

Further, it is possible to adopt a mechanism to distribute the driving torque between the right and left wheels instead of the right-left wheel limiting mechanism 15. An example of such a mechanism may include clutch mechanisms at each of the right and left wheels to adjust the clutch pressures individually. Furthermore, it is also acceptable to equip a driving torque distribution mechanism at either of the front or rear wheels.

In the above embodiment, the torque adjustment limiting value calculator 45 obtains basic driving torque based on the longitudinal acceleration $G_X$ sensed by the longitudinal acceleration sensor, the weight of vehicle 1, the distribution of the driving torque between the front and rear wheels and the distribution of the brake force between the front and rear wheels. However, the present invention is not limited to this configuration.

For example, it is applicable to use the longitudinal acceleration $G_X$ obtained by differentiation of the vehicular velocity $v_B$. Further, it is possible to assume an amount, as the distribution of driving torque, obtained due to the distribution of results of a multiplication to each wheel, the multiplication between the output torque from the engine 2 and the final gear reduction ratio of transmission 3.

In the above embodiment, it is basically explained that when the vehicle 1 turns left, the rear-left wheel 14L and the rear-right wheel 14R are the inside-wheel and the outside-wheel, respectively. However, needless to say, the rear-left wheel 14L is the outside-wheel and the rear-right wheel 14R is the inside-wheel when the vehicle 1 turns right.

The invention thus described, it will be obvious that the same may be varied in many ways. Such variations are not be regarded as a departure from the spirit and scope of the invention, and all such modifications as would be obvious to one skilled in the art are intended to be included within the scope of the following clams.

What is claimed is:

1. A turning control apparatus for a vehicle having a driving torque controlling mechanism adjusting driving torque of a left wheel and a right wheel, said apparatus comprising:
    means for calculating a necessary yaw-momentum value indicating yaw momentum needed for turning of the vehicle;
    means for calculating a maximum-yaw momentum value indicating maximum yaw momentum generated by the driving torque controlling mechanism owing to adjustment of driving torque of the left-wheel and the right wheel;
    means for setting a target yaw-momentum value indicating target yaw momentum in such a manner that if the necessary yaw-momentum value does not exceed the maximum-yaw momentum value then the necessary yaw-momentum value is directly set as the target yaw-momentum value, and if the necessary yaw-momentum value exceeds the maximum-yaw momentum value then the necessary yaw-momentum value is clipped at the maximum-yaw momentum value as the target yaw-momentum value; and
    a driving torque controller for controlling said driving torque controlling mechanism so as to generate yaw momentum corresponding to the target yaw-momentum value;
    said maximum-yaw momentum value calculating means including,
    means for estimating an outside-wheel gripping capacity, which is capacity of adhesive friction between the outside-wheel and a road surface, and an inside-wheel gripping capacity, which is capacity of adhesive friction between the inside-wheel and the road surface, and
    means for calculating a torque adjustment limiting value indicating an adjustment amount of driving torque of the left wheel and the right wheel by the driving torque controlling mechanism so that the adjustment amount does not exceed the outside-wheel gripping capacity and the inside-wheel gripping capacity,
    said maximum-yaw momentum value calculating means setting the maximum-yaw momentum value indicating possible yaw momentum, which is estimated if the driving torque of the outside-wheel and the inside-wheel is adjusted by the driving torque controller using the torque-adjustment-limit value calculated by said torque adjustment limiting value calculating means.

2. The turning control apparatus according to claim 1 further comprising:
    means for calculating a braking-yaw momentum value indicating excess amount beyond the maximum-yaw momentum value in the necessary-yaw momentum; and
    means for adjusting brake force of each wheel of the vehicle so as to generate yaw momentum corresponding to the braking yaw-momentum value calculated by the braking yaw-momentum value calculating means.

3. The turning control apparatus according to claim 1 further comprising:
    means for sensing acceleration in a lateral direction at the vehicle, wherein
    said maximum-yaw momentum value calculating means decreases the torque adjustment limiting value of the inside-wheel according to increments of the lateral acceleration sensed by the lateral acceleration sensing means.

4. The turning control apparatus according to claim 1 further comprising:
    means for sensing acceleration in a longitudinal direction at the vehicle,
    said maximum-yaw momentum value calculating means decreasing the torque adjustment limiting value of the inside-wheel according to increments of the longitudinal acceleration sensed by the longitudinal acceleration sensing means if the vehicle is accelerated.

5. The turning control apparatus according to claim 1 further comprising:
    means for sensing acceleration in a longitudinal direction of the vehicle, wherein
    said maximum-yaw momentum value calculating means, if the vehicle is decelerated, increases the torque adjustment limiting value of the inside-wheel according to increments of absolute value of the longitudinal acceleration sensed by the longitudinal acceleration sensing means.

6. The turning control apparatus according to claim 1 wherein,
    said torque adjustment limiting value calculating means estimates a basic driving torque value indicating the driving torque of the left wheel and the right wheel without the adjustment of driving torque by the driving torque controller,
    said torque adjustment limiting value calculating means also sets the adjustment amount of driving torque, which indicates that the sum of the basic driving torque value of the inside-wheel and the adjustment torque amount does not exceed the inside-wheel gripping capacity in a deceleration direction and that the sum of the basic driving torque value of the outside-wheel and the adjustment torque amount does not exceed the outside-wheel gripping capacity in an acceleration direction, into the torque adjustment limiting value for the inside-wheel,
    said torque adjustment limiting value calculating means also sets the adjustment amount of driving torque, which indicates that the sum of the basic driving torque value of the inside-wheel and the adjustment torque amount is within the inside-wheel gripping capacity in an acceleration direction, and that the sum of the basic driving torque value of the outside-wheel and the adjustment torque amount is within the outside-wheel gripping capacity in a deceleration direction, into the torque adjustment limiting value for the inside-wheel.

* * * * *